United States Patent Office 3,082,185
Patented Mar. 19, 1963

3,082,185
FLAME RESISTANT COMPOSITIONS OF INORGANIC FILLERS AND POLYMERIC PRODUCTS OF HALOMETHYL DIPHENYL OXIDES
James D. Doedens and Donald E. Pletcher, Midland, Mich., assignors to The Dow Chemical Company, Midland, Mich., a corporation of Delaware
No Drawing. Filed Dec. 31, 1958, Ser. No. 784,027
5 Claims. (Cl. 260—37)

This invention concerns composite structures containing inorganic fillers compounded with resinous halomethylated diphenyl oxide binders, halo being chloro or bromo. It also concerns their method of manufacture.

In accordance with this invention, novel structural materials having desirable physical properties are prepared by a process which comprises combining various inorganic fillers such as mica, glass rovings, fibrous glass mats, fibrous glass cloth, silica, alumina, magnesia, etc. with a halomethylated diphenyl oxide monomer as such, hereinafter designated as HMDPO, or in solution or emulsion form, and heating the mass to polymerize and cure the binder.

Suitable HMDPO polymeric binders for the practice of this invention include those of the mono(chloromethyl) and poly(chloromethyl)diphenyl oxides, ditolyl oxides and the like such as monochloromethyl diphenyl oxide, di(chloromethyl)diphenyl oxide, tri(chloromethyl)diphenyl oxide, tetra(chloromethyl)diphenyl oxide, monochloromethyl ditolyl oxide, di(chloromethyl)ditolyl oxide, etc., including their bromo analogs. When compounded with the indicated fillers and heat polymerized, hydrogen halide is evolved and solid or foamed condensation products are obtained depending on the halomethyl content of the monomer, the temperature and the thickness of the monomer layer. Monomers having up to one halomethyl group per molecule on a statistical basis and di(halomethyl)ditolyl oxides give solid products when polymerized. Other monomers having more than one halomethyl group per molecule give foams when polymerized at curing temperatures, e.g., between 90° and 400° C., preferably between 100° and 150° C. The monomers can be used individually or in admixture with one another. A mixture of mono- and di(halomethyl)-diphenyl oxide is particularly advantageous.

The HMDPO's are used as such or in solution or emulsion form, advantageously containing between 5 and 75 weight percent of monomer when a solution is used; or between 5 and 25 weight percent when an emulsion is used, the balance being about 75 to 60 weight parts of water and about 5 to 14 weight parts of an oil-in-water emulsifying agent. The fillers are compounded with the monomers or their solutions or emulsions, generally to provide a resin uptake between 5 and 15 percent, by mixing, dipping, spraying and the like, draining, and heating at a polymerizing temperature ranging between about 100° and 400° C., preferably between 100° and 150° C.

Solutions containing about 5 to 75 weight percent monomer in aromatic hydrocarbon or halohydrocarbon solvents boiling between about 40° and 110° C. are advantageously used in the practice of this invention.

Suitable emulsifying agents include the following well-known types: alkylaryl sulfonates, exemplified by $$C_{12}H_{25}\text{---}C_6H_4\text{---}SO_3Na$$

fatty alkyl sulfates, exemplified by $C_{12}H_{25}OSO_3Na$; nonionic esters, exemplified by $$C_{17}H_{33}CO_2C_2H_4(OC_2H_4)_x\text{---}OH$$

nonionic ethers, exemplified by $$C_8H_{17}C_6H_4OC_2H_4(OC_2H_4)_x\text{---}OH$$

sulfonated fatty amides, exemplified by $$C_{17}H_{33}CON(CH_3)C_2H_4SO_3Na$$

fatty amide condensates, exemplified by $$C_{11}H_{23}CON(C_2H_4OH)_2$$

and the cationic quaternary ammonias, exemplified by $$C_{12}H_{25}(C_6H_5CH_2)\text{---}N(CH_3)_2Cl$$

Mixtures such that of sorbitan mono-oleate, polyoxyethylene esters of mixed fatty and resin acids and alkylamine aryl sulfonates are particularly advantageous as emusifying agents for the HMDPO's.

The HMDPO's are prepared by reaction of a halomethylating agent, such as methyl chloromethyl ether, methyl bromomethyl ether, bis-(chloromethyl)ether, bis-(bromomethyl)ether, or a mixture of formaldehyde and HCl or HBr with a diaryl ether such as diphenyl oxide, ditolyl oxide, etc. in the presence of a Friedel-Crafts type catalyst for the reaction, such as zinc chloride, aluminum chloride, ferric chloride, boron trifluoride, etc. Procedures for carrying out halomethylation reactions are well-known in the art, and can be applied in halomethylating diaryl ethers, such as those mentioned above, to obtain halomethyl diaryl ethers useful as starting materials in the practice of this invention. Mono- or poly-halomethyl diaryl ethers, or mixtures thereof, can be obtained thereby, depending upon the proportion of halomethylating agent used, the extent of the halomethylation reaction and whether steps are taken to separate and purify individual halomethylated aryl ether products. Residual catalyst need not be removed. In fact, it promotes polymerization. When it is desired to accelerate the polymerization rate, additional amounts of catalyst are added to the monomer, advantageously from a trace up to about 1.5 weight percent. It is not necessary that the HMDPO's be separated or purified. On the contrary, mixtures of unseparated and unpurified HMDPO's containing up to 50 weight percent of unreacted diphenyl oxide are commercially attractive. Such mixtures contain HMDPO of varying halomethyl content up to the tetrahalomethylated product, in addition to unrecated diphenyl oxide. Unreacted diphenyl oxide enters into the heat polymerization reaction via the Friedel-Crafts method.

The following examples show ways in which the invention has been practiced.

EXAMPLE 1

Various weights of perlite-plaster aggregate (perlite is an expanded volcanic glass), hereinafter designated as PPA, were mixed with a chloromethyl diphenyl oxide (CMDPO hereinafter) containing 60 percent di- and 40 percent monochloromethyl diphenyl oxide in varying proportions in a 5 in. x 5 in. x 1 in. assembly placed between the platens of a Carver press. The press was lowered to compress each mixture to ¾ in., and the mixture was cured at various temperatures and for various times as indicated in following Table I. After curing and cooling, test samples 1½ in. x 5 in. x ¾ in. were suspended on two rods 4 in. apart and an increasing force was applied to the center of the sample until each sample broke. Results follow.

Table I

| Wt. parts PPA | Wt. parts CMDPO | Cure Temp., °F. | Cure time, mins. | Product density, lb./cu. ft. | Lb. force necessary to break avg. of 3 |
|---|---|---|---|---|---|
| 60 | 40 | 400 | 60 | 13.85 | 11.3 |
| 60 | 40 | 400 | 45 | 14.25 | 10.5 |
| 60 | 40 | 400 | 30 | 14.65 | 18.3 |
| 60 | 40 | 400 | 15 | 14.75 | 19.3 |
| 60 | 40 | 400 | 10 | 14.7 | 17.3 |
| 60 | 40 | 400 | 5 | 14.8 | 21 |
| 70 | 30 | 350 | 60 | 15.1 | 10.5 |
| 70 | 30 | 350 | 45 | 15.2 | 12.5 |
| 70 | 30 | 350 | 30 | 15.1 | 12.3 |
| 70 | 30 | 350 | 15 | 15.3 | 14.0 |
| 70 | 30 | 350 | 10 | 15.0 | 11.3 |

EXAMPLE 2

A foamed board made by molding a mixture of 70 weight parts of CMDPO, composition as in Example 1, and 30 parts of PPA at 350° F. for 45 minutes was subjected to the cutting flame of an acetylene torch for 15 seconds. When the torch was removed, the flame died out and the molding did not smolder.

EXAMPLE 3

Fibrous glass cloth was laminated with the CMDPO of Example 1, heat bodied to 30,000 cps., at 100° C., in solution in methylene chloride, to provide laminates having the indicated pickups, and cured at 180° C. for varying time periods. Flammability was tested pursuant to A.S.T.M. D757–48, Flammability of Plastics, Self-Extinguishing Type, with results as given in following Table II.

Table II

| Bodied CMDPO solution in $CH_2Cl_2$, g. | Concentration of $CH_2Cl_2$ solution, percent CMDPO | Percent pickup | Cure time | Cure temp., °C. | Inches burnt/min., avg. of 3 tests |
|---|---|---|---|---|---|
| 30 | 75 | 46.4 | 30 | 180 | 0.1454 |
| 30 | 75 | 46.5 | 15 | 180 | 0.1400 |
| 50 | 50 | 16.7 | 15 | 180 | 0.1592 |
| 50 | 50 | 22.7 | 15 | 180 | 0.1836 |

EXAMPLE 4

PPA was molded into test panels using the CMDPO of Example 1 as binder in solution in toluene, and tested for burning rate. Formulation and test data follow in Table III.

Table III

| Material and proportions | Cure time, in mins. | Cure temp., °C. | Inches burnt/min., avg. 3 tests |
|---|---|---|---|
| 30 percent CMDPO, 70 percent PPA, 100 ml. toluene | 5 | 170 | 0.0968 |
| 30 percent CMDPO, 70 percent PPA, 100 ml. toluene | 10 | 170 | 0.0893 |
| 30 percent CMDPO, 70 percent PPA, 100 ml. toluene | 15 | 170 | 0.1011 |
| 30 percent CMDPO, 70 percent PPA, 100 ml. toluene | 30 | 170 | 0.1011 |
| 40 percent CMDPO, 60 percent PPA, 100 ml. toluene | 5 | 170 | 0.1123 |
| 40 percent CMDPO, 60 percent PPA, 100 ml. toluene | 10 | 170 | 0.1100 |
| 30 percent CMDPO, 70 percent PPA, 100 ml. toluene | 15 | 150 | 0.1000 |
| 40 percent CMDPO, 60 percent PPA, 100 ml. toluene | 5 | 150 | 0.1060 |
| 40 percent CMDPO, 60 percent PPA, 100 ml. toluene | 5 | 150 | 0.0967 |
| 40 percent CMDPO, 60 percent PPA, 100 ml. toluene | 5 | 150 | 0.0934 |

EXAMPLE 5

CMDPO as in Example 1 was mixed with exploded mica so that the mica was thoroughly wetted by the monomer. The mixture was heated at 125° to 135° C. for 30 minutes to give a fire-resistant brick-like material.

EXAMPLE 6

A layer of exploded mica was placed on a metal plate and sprayed with CMDPO, composition as in Example 1. The layer was heated at 150° C. for 5 minutes with an infrared lamp. After curing, another layer was added. The indicated procedure was repeated in series until a 3 in. layer was built up. A brick-like product, similar to that of Example 5 was obtained.

EXAMPLE 7

A 50–50 mixture of exploded mica and CMDPO, composition as in Example 1, was thoroughly mixed in a 5 gallon can and heated for 2 hours at 150° C. A brick-like product was obtained.

The products of Examples 5, 6 and 7 were foamed, non-combustible products, unattacked by strong acids and bases, insoluble in the common organic solvents benzene, toluene, ethanol, methanol, acetone, chlorobenzene, and dioxane. The particles had good adhesion one to another and gave a tough brick-like product.

EXAMPLE 8

Woven fibrous glass cloth was sprayed with CMDPO, composition as in Example 1, layered with more glass and cured with an infrared lamp. The procedure was repeated until 12 glass cloth laminae had been joined to get a hard foamed "ply-glass" having good resin to glass adhesion.

EXAMPLE 9

Fibrous glass rovings were dipped into a 50 percent solution of CMDPO (composition as in Example 1) in chloroform, drained and cured. After curing at 150° C. for 15 minutes, a foamed mat was obtained which showed good adhesion of resin to glass.

The products of Examples 8 and 9 were hard and tough, resistant to acids and bases, non-combustible, insoluble in common organic solvents of the aromatic hydrocarbon, halohydrocarbon and ketone types and showed no separation of individual layers when cut with a hack saw. They can be used for lining storage tanks, commercial reactors, tank cars, etc.

EXAMPLE 10

A 50–50 mixture of magnesium oxide and CMDPO, composition as in Example 1, was thoroughly stirred and cured at 150° C. for 30 minutes. A strong, tough, dense, non-combustible product was obtained which was not affected by 50 percent sodium hydroxide, concentrated hydrochloric acid or concentrated sulfuric acid.

EXAMPLE 11

A quantity of 112 g. CMDPO, composition as in Example 1, 48 g. PPA, and 21 g. Silex silica were thoroughly mixed. A quantity of 181 g. of the above mixture was added to a 5 in. x 5 in. x 1 in. steel mold. The contents were pressed to ½ in. thickness using 16,000 p.s.i. pressure and allowed to cure at 180° C. for 5 minutes. After removing the resulting board and cooling, the product weighed 150 g. This corresponds to a density of 45.5 lb./cu. ft. The board was extremely hard and had a smooth surface. The flame of an oxy-acetylene torch (approximately 4500° F.) was directed at the upper surface of the board. At the second the flame hit the surface, a stopwatch was started. The flame was removed and the watch stopped when the red glow on the underside of the board burst into flame. This did not mean the flame cut through the board. Using this set up, 174 seconds passed before the bottom surface burst into flame around the flame source. This corresponds to 142 seconds reported for Astrolite, a resin-silica combination for withstanding the heat of rocket exhaust, as described in Chemical Engineering, January 27, 1958, page 74. The thickness required for 100 seconds' burn through corresponds to 0.287 inch in comparison to 0.39 inch for Astrolite. After curing, this board contained 54 percent organic material as polymerized CMDPO.

EXAMPLE 12

A quantity of 160 g. of a mixture containing CMDPO composition as in Example 1, 25 percent PPA and 15 percent Silex silica was added to a 5 in. x 5 in. x 1 in. mold, compressed to ½ in. thickness using 16,000 p.s.i. pressure, and allowed to cure for 5 minutes at 180° C. After removal from the press and cooling, the board weighed 115.5 g. Assuming the loss to be CMDPO, the board contained 43.5 percent organic material, as polymerized CMDPO, after curing. The product had a density equal to 35 lb. per cu. ft. On exposure to the flame test described in Example 11, 156 seconds elapsed before the bottom surface burst into flame. This corresponds to the 142 seconds reported in the cited article. Thickness required for 100 seconds' burn through is 0.327 inch as compared to 0.39 inch for Astrolite.

It is important to note that in Examples 11 and 12 there was a charred area on the upper surface of only a few square inches around the point where the flame hit. Even this is a very low degree of penetration. On the bottom surface there was charring only in a circle of approximately 1 in. in diameter. The PPA actually was fused to a glass where the flame hit it. In the above time neither of the boards was cut through by the flame.

The following examples illustrate the use of a HMDPO mixture:

EXAMPLE 13

A quantity of

|  | G. |
|---|---|
| CMDPO mixture (composition below) | 200 |
| MgO | 29 |
| Fe$_3$(PO$_4$)$_2$ catalyst | 2 |
| Silica fibers | 115 | was intimately mixed and molded to form a board 5 in. x 5 in. x 1 in. Curing temperature was 175° C. for 5 minutes. The board density was 70 lb./ft.$^3$. The bottom surface of the cooled board was then exposed to an oxygen-natural gas flame in a continuing test. For 2.5 minutes, the upper surface was cool to the touch. After 3.5 minutes, a blackening occurred on the upper surface. After 4.5 minutes the upper surface glowed red, but no hole was burned through.

The percentage composition (approximate) of the CMDPO mixture was:

| Diphenyl oxide | 31 |
|---|---|
| Mono CMDPO | 42 |
| Di CMDPO | 24 |
| Tri CMDPO | 3.1 |
| Tetra CMDPO | 0.35 |

EXAMPLE 14

The procedure of Example 13 was repeated with the following recipe:

|  | G. |
|---|---|
| CMDPO mixture of Example 13 | 210 |
| PPA | 60 |
| Flaked glass | 30 |
| Fe$_3$(PO$_4$)$_2$ | 2 |

The bottom surface of the molded board prepared as shown in Example 13 was flamed as before, with the following results:

| Top surface blackened | minutes | 3 |
|---|---|---|
| Top surface red hot | do | 5 |
| No burn through |  |  |
| Board density | lb./ft.$^3$ | 75 |

Example 15

The procedure of Example 13 was repeated with the following recipe.

|  | G. |
|---|---|
| CMDPO mixture of Example 13 | 140 |
| PPA | 40 |
| Flaked glass | 20 |
| Fe$_2$(PO$_4$)$_3$ | 2 |

Board flame test results:

| Top surface blackened | minutes | 2.5 |
|---|---|---|
| Burned through top side | do | 2.9 |
| Board density | lb./ft.$^3$ | 55 |

What is claimed is:

1. A composition comprising an inorganic filler of the group consisting of mica, glass rovings, fibrous glass mats, fibrous glass cloth, silica, alumina, magnesia and perlite-plaster aggregate and a solid resinous polymeric condensed halomethyl diphenyl oxide binder.

2. The composition of claim 1 wherein the filler is a fibrous glass.

3. The composition of claim 1 wherein the filler is exploded mica.

4. The composition of claim 1 wherein the filler is magnesia.

5. A composition comprising perlite-plaster aggregate filler and a solid resinous polymeric condensed halomethyl diphenyl oxide binder.

References Cited in the file of this patent

FOREIGN PATENTS

| 2,501,698 | Stecker | Mar. 28, 1950 |
| 2,512,697 | Te Grotenhuis | June 27, 1950 |
| 2,683,133 | Harvey et al. | July 6, 1954 |
| 2,866,768 | Bolstad | Dec. 30, 1958 |
| 2,884,380 | Cook et al. | Apr. 28, 1959 |
| 2,911,380 | Doedens | Nov. 3, 1959 |

FOREIGN PATENTS

| 569,570 | Germany | Feb. 4, 1933 |